United States Patent
Hsu

(10) Patent No.: US 7,373,493 B2
(45) Date of Patent: May 13, 2008

(54) BOOT METHODS, COMPUTER SYSTEMS, AND PRODUCTION METHODS THEREOF

(75) Inventor: Wen-Shiu Hsu, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 379 days.

(21) Appl. No.: 11/168,393

(22) Filed: Jun. 29, 2005

(65) Prior Publication Data

US 2006/0041740 A1 Feb. 23, 2006

(30) Foreign Application Priority Data

Aug. 19, 2004 (TW) .............................. 93124927 A

(51) Int. Cl.
*G06F 9/00* (2006.01)
*G06F 9/24* (2006.01)
*G06F 15/177* (2006.01)

(52) U.S. Cl. .............................. 713/1; 713/2
(58) Field of Classification Search ............ 713/2, 713/1
See application file for complete search history.

(56) References Cited

U.S. PATENT DOCUMENTS

| | | | |
|---|---|---|---|
| 6,115,815 A * | 9/2000 | Doragh et al. ................. | 713/2 |
| 6,209,088 B1 * | 3/2001 | Reneris ........................ | 713/1 |
| 6,968,450 B1 * | 11/2005 | Rothberg et al. ............... | 713/1 |
| 2004/0078636 A1 | 4/2004 | Suzaki | |
| 2005/0278523 A1 * | 12/2005 | Fortin et al. .................... | 713/1 |
| 2006/0200691 A1 * | 9/2006 | Yomo et al. ................. | 713/323 |

FOREIGN PATENT DOCUMENTS

WO WO-2004/012060 A2 5/2004

* cited by examiner

*Primary Examiner*—Chun Cao
*Assistant Examiner*—Michael Wang
(74) *Attorney, Agent, or Firm*—Birch, Stewart, Kolasch & Birch, LLP

(57) ABSTRACT

Boot methods for use in a computer system. The computer system boots from a partition comprising an OS in hibernation mode. The OS exits the hibernation mode to a normal operating mode according to a hibernation file, and marks the hibernation file. The marked hibernation file is modified to the original hibernation file, and access to the partition returns to being monitored. If a write request to the partition is received, the data is discarded or written to another partition or a system memory of the computer system, and a write completion message is replied. If the computer system reboots, the OS also returns to the normal operating mode according to the original hibernation file.

13 Claims, 4 Drawing Sheets

BOOT METHODS, COMPUTER SYSTEMS, AND PRODUCTION METHODS THEREOF

BACKGROUND OF THE INVENTION

1. Field of the Invention

The present disclosure relates generally to boot management, and, more particularly to boot methods, computer systems, and production methods thereof.

2. Brief Discussion of the Related Art

With the development of IT (Information Technology), computer systems are widely used by enterprises and individuals. In a conventional boot procedure, POST (Power On Self Test) operations are first performed after a computer system is powered on. Then, BIOS (Basic Input/Output System) is loaded to perform hardware detection and related initializations thereto. Then, BIOS retrieves partition information in MBR (Master Boot Record), finds an active and primary partition therein, and transfers an execution right to the partition. A boot loader in the partition boots the computer system according to a normal boot procedure of the OS (Operating System), entering the computer system into a working state. Generally, the normal boot procedure requires 30 seconds to several minutes.

Additionally, in addition to conventional functions that a computer can provide, most computer systems have integrated many additional functions for the purpose of entertainment. In practice, when users use a computer system for multimedia, the computer system functions solely as an electronic multimedia device, and is expected to boot speedily. Conventionally, the computer system must boot according to the normal boot procedure, and execute related application programs to play multimedia. The normal boot procedure of the computer system takes a long time, loading numerous application programs and drivers and enabling initial settings. In another conventional procedure, related application programs and peripheral hardware corresponding to the specified multimedia functions are triggered by BIOS, and controlled to play back by a specific microcontroller. The software/firmware, however, is dependent on the hardware, and must be designed for respective hardware. Therefore, commercial and popular application programs on the market cannot be applied directly, resulting in high cost and low flexibility.

Further, users always turn off electronic multimedia devices directly. The computer system, however, requires a specific procedure to turn off, without which, data or OS in the partition may be damaged. Unfortunately, no mechanism is provided to protect the computer system.

SUMMARY OF THE INVENTION

Boot methods, computer systems, and production methods thereof are provided.

In an exemplary embodiment of a boot method for use in a computer system, the computer system boots from a partition comprising an OS (operating system) in a hibernation mode. The OS exits the hibernation mode to a normal operating mode according to a hibernation file, and marks the hibernation file. The marked hibernation file is modified to the original hibernation file by management software, and access to the partition is returned to monitor. If a write request to the partition is received, data is discarded or written to another partition or a system memory of the computer system, and a write completion message is replied. If the computer system reboots, the OS also returns to the normal operating mode according to the original hibernation file.

If the write request to the partition is received, and data is written to another partition or the system memory of the computer system, location of the data is recorded. If an application program requires the data, the data is retrieved according to the location, and returned to the application program.

After the OS exits the hibernation mode to the normal operating mode, at least one application program is returned to execute to perform multimedia playback or other operations.

The hibernation file records an operating state of the computer system, and the capacity of the hibernation file equals that of the system memory.

An exemplary embodiment of a computer system comprises a partition comprising a hibernation file, an OS, and management software. The OS is in a hibernation mode when the computer system is powered off. The computer system boots from the partition. The OS exits the hibernation mode to a normal operating mode according to the hibernation file, and marks the hibernation file. After the OS exits the hibernation mode to the normal operating mode, the management software returns to execute. The management software modifies the marked hibernation file to the original hibernation file, and monitors access to the partition. If a write request to the partition is received, data is discarded or written to another partition or a system memory of the computer system, and a write completion message is returned. If the computer system reboots, the OS also returns to the normal operating mode according to the original hibernation file.

If the write request to the partition is received by the management software, and the data is written to another partition or the system memory of the computer system, location of the data is recorded. If an application program requires the data, the data is retrieved according to the location, and is returned to the application program.

After the OS exits the hibernation mode to the normal operating mode, at least one application program returns to execute to perform multimedia playback or other operations.

The hibernation file records an operating state of the computer system, and the capacity of the hibernation file equals to that of the system memory.

In an exemplary embodiment of a production method for computer systems, a computer system conforming to an ACPI (Advanced Configuration and Power Interface) specification is provided. A storage device is provided in the computer system. The storage device comprises a partition comprising an OS. Management software is installed in the partition and executed. The management software monitors access to the partition. If a write request to the partition is received by the management software, data is discarded or written to another partition or a system memory of the computer system, and a write completion message is returned. If the OS marks a hibernation file, the management software modifies the marked hibernation file to the original hibernation file. The computer system, enabled to enter a hibernation mode, is powered off.

At least one application program is installed in the partition, and executed. The application program performs multimedia playback or other operations.

Boot methods may take the form of program code embodied in tangible media. When the program code is loaded into and executed by a machine, the machine becomes an apparatus for practicing the disclosed method.

Further scope of the applicability the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings, which are given by way of illustration only, and thus are not limitative of the present invention, and wherein.

DETAILED DESCRIPTION OF THE PREFERRED EMBODIMENTS

Boot methods, computer systems, and production methods thereof are provided.

Figure 1:
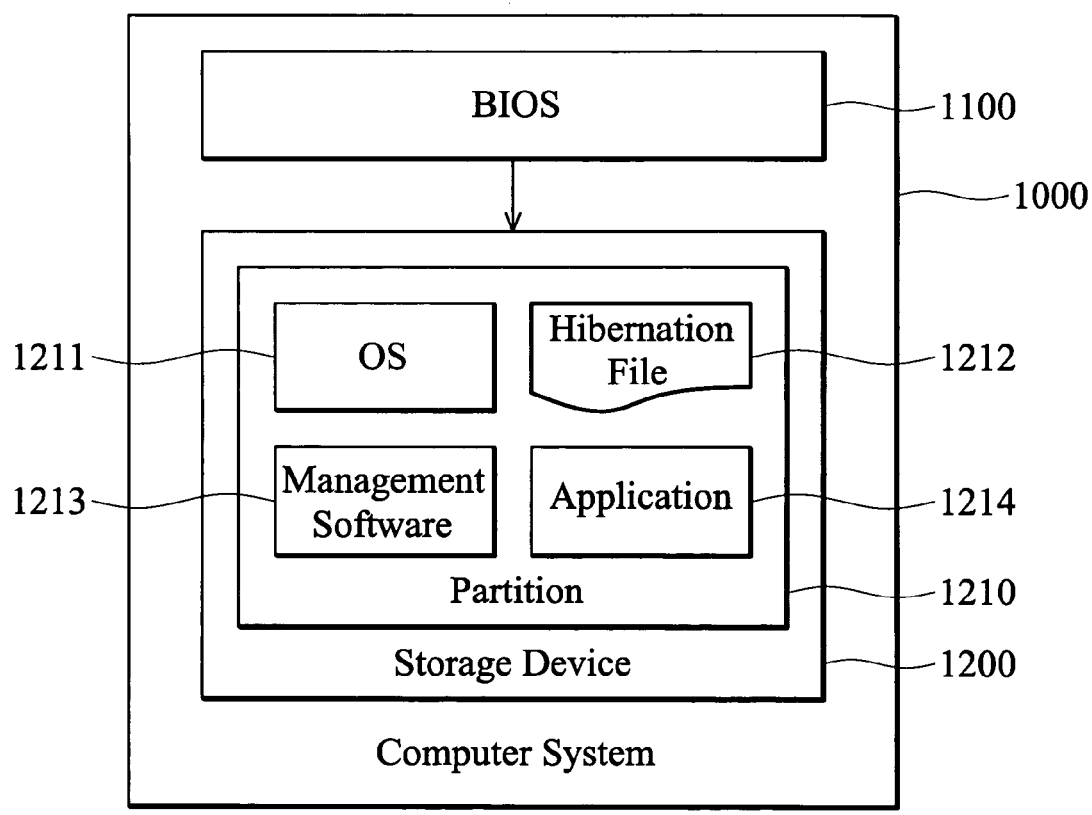
FIG. 1 is a schematic diagram illustrating an embodiment of a computer system.

FIG. 1 is a schematic diagram illustrating an embodiment of a computer system.

The computer system 1000 conforms to the ACPI specification. ACPI is a power management system that helps OS to manage computer system and power thereto. The power management system enables an OS to manage power consumption for respective peripheral devices. For example, hard disc or monitor can enter a power-saving mode or stop operating if it is not used for a predetermined interval.

The computer system 1000 comprises a BIOS 1100 and a storage device 1200. The storage device 1200 comprises at least one partition 1210. The partition 1210 is an active and primary boot partition. The BIOS 110 is firmware stored in a ROM (Read Only Memory) on the motherboard of the computer system 1000, and provides several functions, such as basic input and output, setting configuration, hardware testing of the computer system, and others. In some embodiments, the BIOS 1100 can boot from the partition 1210 directly. It is understood that, to provide the normal boot procedure, another boot partition can be included in the storage device 1200 of the computer system 1000. Further, the BIOS 110 can provide multiple boot modes for booting in different ways.

The partition 1210 comprises an OS 1211, a hibernation file 1212, management software 1213, and an application program 1214. The hibernation file 1212 is automatically generated if the OS 1211 enters a hibernation mode. The hibernation file 1212 records an operating state of the computer system 1000, with the capacity of the hibernation file 1212 equaling that of the system memory. To exit the hibernation mode to a normal operating mode, the OS 1211 returns the computer system 1000 to the original operating state before hibernation, according to the hibernation file 1212. It is understood that the hibernation file 1212 is marked by the OS 1211 after the OS 1211 returns to normal operating mode, such that the hibernation file 1212 cannot be used in next boot procedure.

Figure 2:
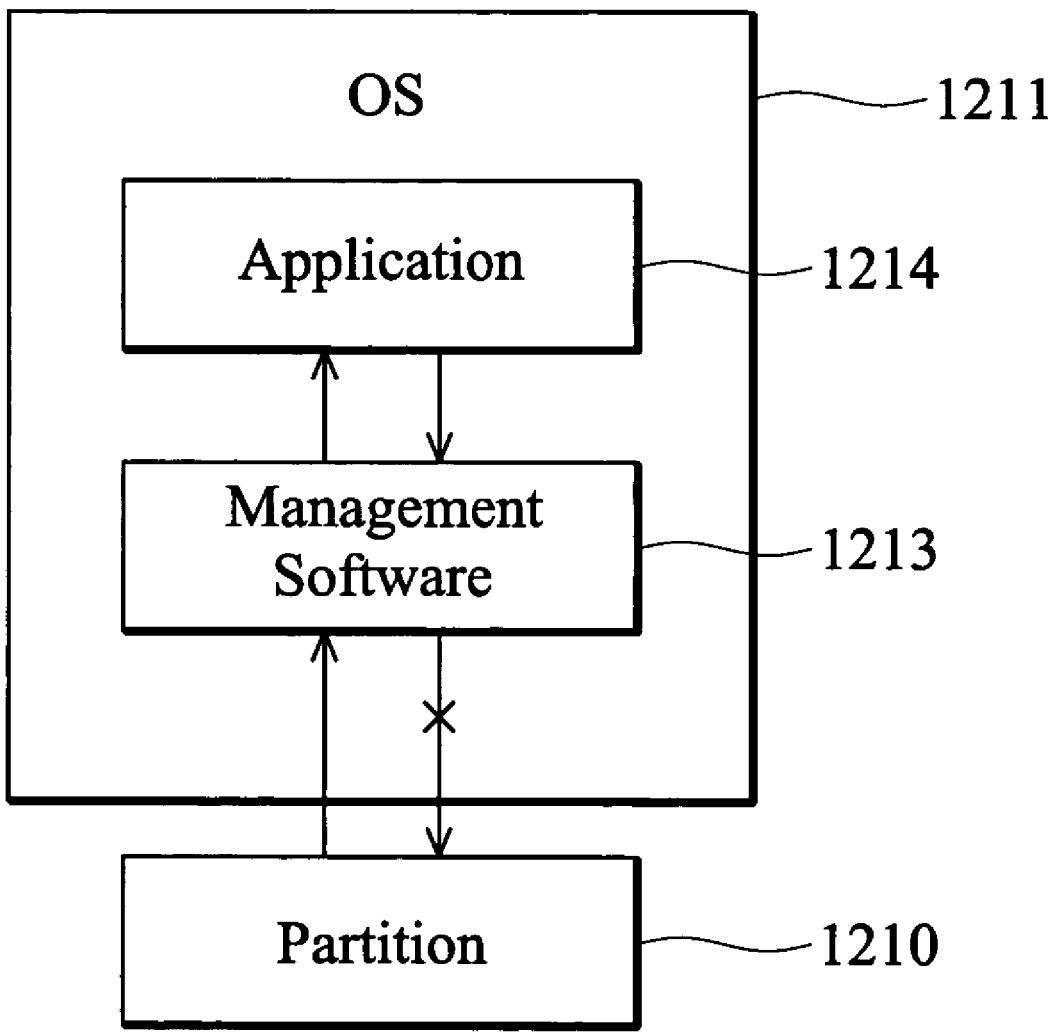
FIG. 2 is a schematic diagram illustrating an embodiment of write protection for a partition.

The application program 1214 may be a program performing multimedia playback or other operations. The management software 1213 modifies the marked hibernation file 1212 to the original hibernation file 1212, and monitors access to the partition 1210, to prevent writing data to the partition 1210. For example, the write requests to the partition 1210 from the application program 1214 can be blocked. FIG. 2 is a schematic diagram illustrating an embodiment of write protection for a partition. As shown in FIG. 2, to write data to the partition 1210, the write request is transmitted to the management software 1213 via the OS 1211. If the write request is received, the management software 1213 does not write the data to the partition 1210, but discard the data or write the data to another partition or a system memory of the computer system 1000, and return a write completion message to the application program 1214 via the OS 1211. It is understood that some application programs may be interrupted if no acknowledgment is returned when they write data. Therefore, returning write completion messages ensures operation of the application programs. Further, if data is written to another partition or the system memory of the computer system 1000, location thereof is recorded. To read the data, the management software 1213 retrieves the data according to the location, and returns the data to the application program 1214.

It is understood that the management software 1213 and application program 1214 are executed before hibernation of the computer system 1000. That is, after the computer system 1000 boots, and the OS 1211 exits the hibernation mode to the normal operating mode according to the hibernation file 1212, the management software 1213 and application program 1214 are automatically returned to execute.

Figure 3:
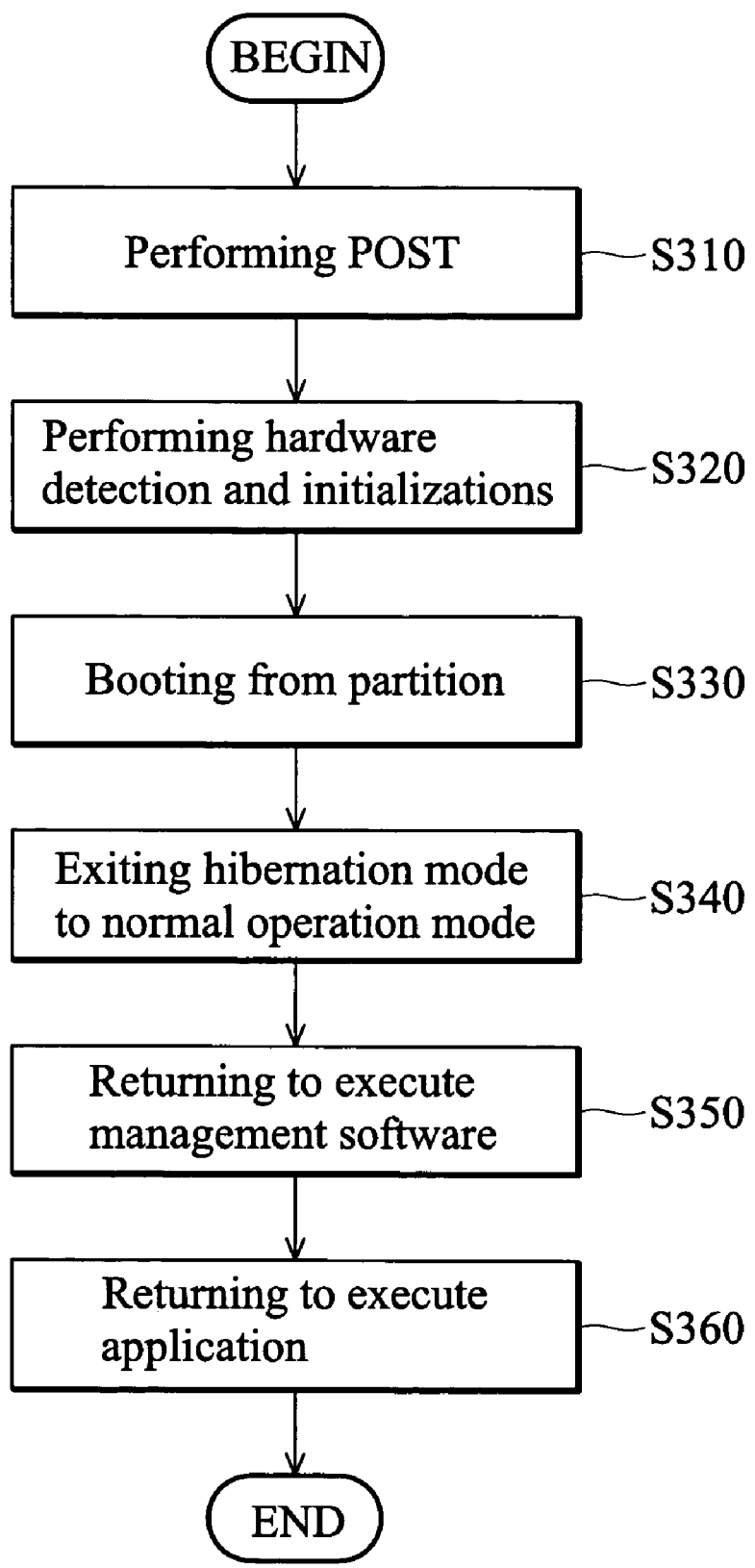
FIG. 3 is a flowchart of an embodiment of a boot method.

FIG. 3 is a flowchart of an embodiment of a boot method.

In step S310, POST operations are first performed when the computer system 1000 is powered on. Then, in step S320, BIOS 1100 is loaded to perform hardware detection and related initializations thereof. In step S330, the computer system 1000 boots from the partition 1210 directly. As described, to provide the normal boot procedure and the faster boot method of the present invention, respective boot partitions can be provided in the storage device 1200, and multiple boot modes can be provided by the BIOS 110 for booting the computer system 1000 from different partitions.

Since the hibernation file 1212 is in the partition 1210, in step S340, the OS 1211 exits the hibernation mode to the normal operating mode according to the hibernation file 1212. In step S350, the management software 1213 automatically returns to execute, and in step S360, the application program 1214 automatically returns to execute for multimedia playback. It is understood that the hibernation file 1212 is marked by the OS 1211 after the OS 1211 returns to the normal operating mode. After the management software 1213 returns to execute, the management software 1213 modifies the marked hibernation file 1212 to the original hibernation file 1212, such that the original hibernation file 1212 can be used when the computer system 1000 reboots. Additionally, the management software 1213 returns to monitor access to the partition 1210, to prevent writing data to the partition 1210. If a write request is received, the management software 1213 discards the data or writes the data to another partition or a system memory of the computer system 1000, and returns a write completion message. After the boot procedure is complete, the computer system 1000 can execute other programs. Corresponding results, however, are not stored to the partition 1210 since the partition 1210 is protected by the management software 1213.

Figure 4:
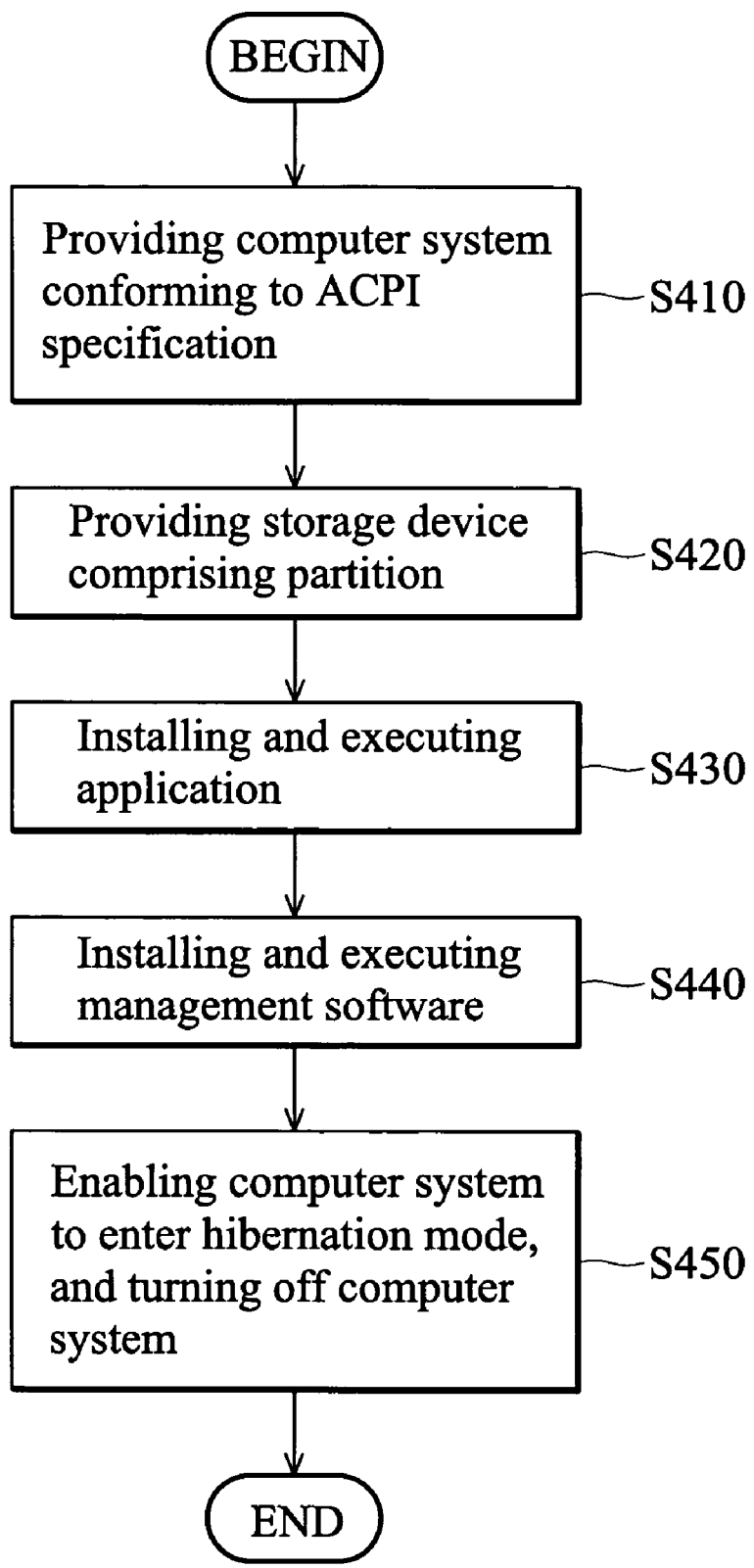
FIG. 4 is a flowchart of an embodiment of a production method for computer systems.

FIG. 4 is a flowchart of an embodiment of a production method for computer systems.

In step S410, a computer system conforming to the ACPI specification is provided. Then, in step S420, a storage device is provided and installed in the computer system. The storage device comprises a partition comprising an OS. In step S430, an application program, such as a multimedia player is installed in the partition, and executed. In step S440, management software is installed in the partition and executed. The management software monitors access to the partition. If a write request to the partition is received by the management software, data is discarded or written to another partition or a system memory of the computer system, and a write completion message is replied. If the OS marks a hibernation file, the management software modifies the marked hibernation file to the original hibernation file. Then, in step S450, the computer system is enabled to enter a hibernation mode, and is powered off.

Boot methods, or certain aspects or portions thereof, may take the form of program code (i.e., executable instructions) embodied in tangible-media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application program specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A boot method for use in a computer system, comprising:
    booting the computer system from a partition having an operating system (OS) in a hibernation mode;
    exiting the operating system (OS) from the hibernation mode to a normal operating mode according to a hibernation file, and marking the hibernation file as a marked hibernation file;
    modifying the marked hibernation file to recover the hibernation file before marking;
    returning to monitor access to the partition after the operating system (OS) is returned to the normal operating mode;
    if a write request to the partition is received, discarding data or writing the data to another partition or a system memory of the computer system, and responding a write completion message; and
    if the computer system reboots, returning the operating system (OS) to the normal operating mode according to the hibernation file before marking.

2. The method of claim 1, wherein the hibernation file records an operating state of the computer system before entering the hibernation mode, wherein the capacity of the hibernation file equals that of the system memory.

3. The method of claim 1, further comprising recording location of the data, if the write request to the partition is received, and the data is written to another partition or the system memory of the computer system.

4. The method of claim 3, further comprising retrieving the data according to the location, and returning the data to the application program, if an application program requires the data.

5. The method of claim 1, further comprising returning at least one application program to execute after the OS exits the hibernation mode to the normal operating mode.

6. A computer system, comprising:
    a partition from which the computer system boots, the partition having:
    a hibernation file;
    an operating system (OS) in hibernation mode when the computer system is powered off, in which the operating system (OS) exits the hibernation mode to a normal operating mode according to the hibernation file if the computer system boots, and marks the hibernation file as a marked hibernation file; and
    management software returned to execute after the operating system (OS) exits the hibernation mode to the normal operating mode, in which the management software modifies the marked hibernation file to recover the hibernation file before marking, monitors access to the partition, discards data or writes data to another partition or a system memory of the computer system, and responding a write completion message if a write request to the partition is received,
    if the computer system reboots, the operating system (OS) returns to the normal operating mode according to the hibernation file before marking.

7. The computer system of claim 6, wherein the hibernation file records an operating state of the computer system, and wherein the capacity of the hibernation file equals that of the system memory.

8. The computer system of claim 6, wherein if the write request to the partition is received, and the data is written to another partition or the system memory of the computer system, location of the data is recorded.

9. The computer system of claim 8, wherein if an application program requires the data, the data is retrieved according to the location, and is returned to the application program.

10. The computer system of claim 6, further comprising at least one application program returned to execute after the OS exits the hibernation mode to the normal operating mode.

11. A production method for computer systems, comprising:
    providing a computer system conforming to an Advanced Configuration and Power Interface (ACPI) specification;
    providing a storage device in the computer system, having a partition with an operating system (OS);
    installing management software in partition, and executing the management software, in which the management software monitors access to the partition, discards data or writes data to another partition or a system memory of the computer system, and responds a write completion message if a write request to the partition is received, and if the operating system (OS) marks a hibernation file, modifies the marked hibernation file to recover the hibernation file before marking; and enabling the computer system to enter a hibernation mode.

12. The method of claim 11, further comprising turning off the computer system.

13. The method of claim 11, further comprising installing at least one application program in the partition, and executing the application program.

* * * * *